United States Patent [19]

Arai et al.

[11] Patent Number: 4,835,068

[45] Date of Patent: May 30, 1989

[54] MAGNETIC RECORDING MEDIUM

[75] Inventors: Yoshihiro Arai; Tadashi Yasunaga; Ryuji Shirahata, all of Kanagawa, Japan

[73] Assignee: Fuji Photo Film Co., Ltd., Kanagawa, Japan

[21] Appl. No.: 113,380

[22] Filed: Oct. 27, 1987

Related U.S. Application Data

[63] Continuation of Ser. No. 767,780, Aug. 20, 1985, abandoned.

[30] Foreign Application Priority Data

Aug. 24, 1984 [JP] Japan ................................ 59-176164

[51] Int. Cl.$^4$ .............................................. B11B 5/66
[52] U.S. Cl. ................................ 428/694; 252/62.55; 252/62.56; 427/48; 427/128; 428/900
[58] Field of Search ................. 428/694, 900; 427/48, 427/128; 252/62.55, 62.56

[56] References Cited

U.S. PATENT DOCUMENTS

| 3,681,018 | 8/1972 | Knawff | 423/409 |
| 4,271,232 | 6/1981 | Heiman et al. | 428/694 |
| 4,452,857 | 6/1984 | Yamazaki | 428/328 |
| 4,557,944 | 12/1985 | Arai et al. | 427/39 |
| 4,673,610 | 6/1987 | Shirahata et al. | 428/213 |

FOREIGN PATENT DOCUMENTS

| 59304 | 4/1982 | Japan . | |
| 87809 | 5/1984 | Japan | 428/694 |
| 144034 | 8/1984 | Japan . | |
| 144035 | 8/1984 | Japan . | |
| 207426 | 11/1984 | Japan . | |

Primary Examiner—George F. Lesmes
Assistant Examiner—James B. Monroe
Attorney, Agent, or Firm—Gerald J. Ferguson, Jr.

[57] ABSTRACT

A magnetic recording medium comprises a non-magnetic substrate and a magnetic film which is formed on the non-magnetic substrate and the major component of which is iron nitride-oxide.

2 Claims, 1 Drawing Sheet

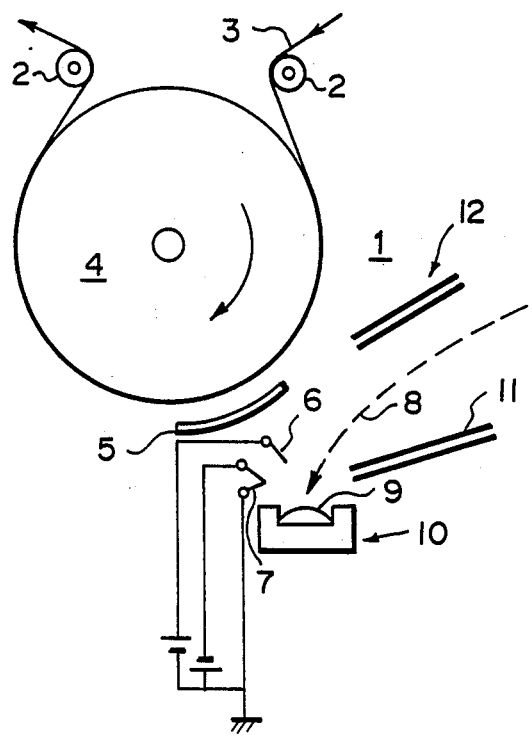

MAGNETIC RECORDING MEDIUM

This application is a continuation of Ser. No. 767,780, filed Aug. 20, 1985, now abandoned.

BACKGROUND OF THE INVENTION

1. Field of the Invention

This invention relates to a magnetic recording medium, and more particularly to a non-binder type magnetic recording medium useful as a video recording tape and the like.

2. Description of the Prior Art

As a magnetic recording medium, there have been in wide use coating type magnetic recording media which are formed by applying a dispersion of powdered magnetic material in an organic binder to a non-magnetic substrate and drying it. The coating type magnetic recording media are not suitable for high density recording since, as the magnetic material, metal oxides the saturation magnetization of which is smaller than that of ferromagnetic metals, are used. Further, a coating type magnetic recording medium is disadvantageous in that the manufacturing process is complicated and large scale equipment is required for recovery of solvents and prevention of environmental pollution.

In response to strong demand for high density recording, there have been developed non-binder type magnetic recording media having, as the magnetic recording layer, a ferromagnetic film formed by a vapor deposition process such as vacuum deposition, sputtering, ion plating or the like, or a plating process such as electroplating or electroless plating. The non-binder type magnetic recording medium is advantageous over the coating type magnetic recording medium in that the recording layer can be formed of ferromagnetic metal having a saturation magnetization larger than that of metal oxide used for forming the recording layer of the coating type recording medium and can be formed without non-magnetic material such as the binder being included in the recording layer, and accordingly the recording layer of the non-binder type magnetic recording medium has a higher magnetic coercivity and is thinner compared with the recording layer of the coating type magnetic recording medium. Further, the manufacturing process of the non-binder type magnetic recording medium is relatively simple and is free from environmental pollution due to organic solvents. In particular, the recording layer of the non-binder type recording medium can be thinner than that of the coating type recording medium by a factor of ten, therefore it has been attracting attention as a recording medium for high density magnetic recording.

However, the magnetic film (recording layer) of the non-binder type magnetic recording medium is apt to corrode and is inferior to the recording layer of the coating type magnetic recording medium in resistance to weathering and corrosion prevention properties. In particular, when the recording layer is being contacted by a magnetic head during recording/reproduction, any slight corrosion on the surface of the recording layer can cause clogging with the magnetic head, which can result in damage to the recording medium and the magnetic head. When corrosion of the recording layer increase, the recording layer is apt to peel off, causing loss of recorded information.

Further, there is a problem with durability of the non-binder type magnetic recording medium. That is, the non-binder type magnetic recording medium is inferior to the coating type magnetic recording medium in still-mode durability as used in a video tape recorder, and therefore there has been strong demand for improvement thereof.

There have been proposed various methods of improving the resistance to weathering and durability of the non-binder type magnetic recording medium. For example, it is proposed in Japanese Unexamined Patent Publication No. 50(1975)-33806 to surface-nitride the non-binder type magnetic recording medium by ion plating process. In Japanese Unexamined Patent Publication No. 53(1978)-30304, there is disclosed a method in which a silicon nitride film is formed on the surface of the non-binder type magnetic recording medium by sputtering. In Japanese Unexamined Patent Publication No. 53(1978)-85403 is disclosed a method in which a magnetic film is exposed to discharge in a nitrogen atmosphere to form a non-magnetic surface layer. Further, in Japanese Unexamined Patent Publication No. 54(1979)-143111, there is disclosed a method in which a metal nitride film is formed on a magnetic metal film. However, none of these methods are satisfactory in that the protective layer formed by the various methods described above must be large in thickness in order to achieve sufficient resistance to weathering and sufficient durability. When the protective layer is large in thickness, the electromagnetic transduction properties are significantly deteriorated and the advantage of the non-binder type magnetic recording medium is lost. A non-binder type magnetic recording medium having a magnetic film of iron nitride and iron, or of iron nitride as disclosed in European Pat. No. 8328 and Japanese Unexamined Patent Publication No. 59(1984)-87809 exhibits superior resistance to weathering, but is lacking in magnetic properties and durability.

SUMMARY OF THE INVENTION

In view of the foregoing observations and description, the primary object of the present invention is to provide a magnetic recording medium which exhibits excellent resistance to weathering and durability.

The magnetic recording medium in accordance with the present invention comprises a non-magnetic substrate and a magnetic film which is formed on the non-magnetic substrate and the major component of which is iron nitride-oxide. Preferably, the magnetic film has a composition represented by the formula

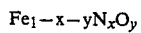

$$Fe_{1-x-y}N_xO_y$$

wherein $0.25 \leq X+Y < 0.60$; more preferably, $X > Y$.

Said magnetic film layer should preferably be formed by oblique incidence deposition.

The thickness of the magnetic film is generally 0.02 μm to 5.0 μm, and is preferably 0.05 μm to 2.0 μm taking into account the thickness required to give sufficient output as a magnetic recording medium and the thickness suitable for high density recording.

Preferably, the non-magnetic substrate is of a plastic base material such as polyethylene terephthalate, polyimide, polyamide, polyvinyl chloride, cellulose triacetate or polycarbonate.

There may be formed on the magnetic film layer a lubricant layer such as of fatty acid the carbon number of which is 12 to 18 (R1COOH, R1 being an alkyl or alkylene group having 11 to 17 carbon atoms), metallic salts of such fatty acid, silicone oils, at least one of fatty esters consisting of monobasic fatty acid the carbon number of which is 2 to 20 and monovalent alcohols the carbon number of which is 3 to 12, and the like. The lubricant is preferably provided on the magnetic film in an amount of 0.5 to 20 mg/m². The lubricant may be directly coated on the magnetic film or may be transferred to the magnetic film after being first coated on a support.

If desired, a back layer may be provided on the rear side of the substrate. Also, if desired, an organic or inorganic layer may be formed between the substrate and the magnetic film.

BRIEF DESCRIPTION OF THE DRAWING

The single figure is a schematic view showing a part of a metallizing apparatus used for preparing a magnetic recording tape in accordance with an embodiment of the present invention.

DETAILED DESCRIPTION OF THE INVENTION

The present invention will now be described in more detail with reference to an example.

EXAMPLE

By using the take-up type deposition apparatus shown in FIG. 1, a magnetic film of iron nitride-oxide was formed on a 9.5 μm thick polyethylene terephthalate substrate by oblique incidence deposition, thereby preparing a magnetic recording tape. That is, the strip-like substrate 3 was transferred along a cooling can 4 and the magnetic film was formed on the surface of the substrate 3 by oblique incidence deposition.

Deposition was effected by heating deposition material 9, Fe(3N), in a crucible 10 by an electron beam 8. A thermoionic emitting filament 7, an ionization electrode 6 and a nitrogen introduction pipe 11 were disposed above the crucible 10. An electric voltage was imparted to the thermoionic emitting filament 7 to incandesce it, thereby causing the thermoionic emitting filament 7 to emit thermoelectrons, and at the same time, an electric voltage of 60v was applied to the ionization electrode 6 while nitrogen was introduced through the nitrogen introduction pipe 11 at a rate of 200 cc/min., whereby nitrogen and deposition material particles were ionized. The incident angle was controlled to 60° by a shield mask 5. Oxygen was introduced through an oxygen introduction pipe 12 at a rate of 100 cc/min.

Deposition was effected under a vacuum of $2.7 \times 10^{-4}$ Torr, and the thickness of the deposited magnetic film was 0.1 μm.

COMPARATIVE EXAMPLE

By using the deposition apparatus shown in FIG. 1, a comparative magnetic recording tape was prepared by depositing $Co_{0.8}Ni_{0.2}$ to a thickness of 0.1 μm. The incident angle was controlled to 40° and only oxygen was introduced at a rate of 300 cc/min.

Resistance to weathering, durability, and magnetic properties of the magnetic recording tapes thus obtained were measured. The resistance to weathering was evaluated in terms of the state of corrosion after the magnetic recording tapes were placed in a dew-cycle test type weatherometer (Yamazaki Seiki Kenkyusho, Model E-12WG) for 24 hours. The state of corrosion was evaluated by use of a five-grades system. The durability was evaluated in terms of damage to the magnetic film surface inflicted by the magnetic head after the tapes were operated in still mode in a VHS type video tape recorder for ten minutes. The damage to the magnetic film surface was evaluated using five-grade system, as observed by microscope.

As for the magnetic properties, the magnetic coercivity Hc and the residual magnetization φr were measured by a sample vibration type fluxmeter (Toei Kogyo, Model VSM-3. The results are shown in the following table.

| Sample | Magnetic properties | Resistance to weathering* | Durability* |
|---|---|---|---|
| Example | Hc = 990 oe<br>φ = 1800 gauss | 5 | 5 |
| Comparative | Hc = 1020 oe<br>φ = 3900 gauss | 1 | 2 |

*Grades one to five, grade 5 being the best.

As can be understood from the above table, the recording medium in accordance with the present invention is superior to the conventional one in resistance to weathering and durability.

We claim:

1. A non-binder type magnetic recording medium comprising a non-magnetic substrate and a magnetic film layer is formed on the non-magnetic substrate such that the magnetic film layer has an upper surface and an opposed lower surface disposed adjacent the non-magnetic substrate and the major component of which is iron nitride-oxide represented by formula $$Fe_{1-x-y}N_xO_y$$

wherein $0.25 \leq X+Y < 0.60$, in which said magnetic film layer is formed by oblique incidence deposition, the magnetic film layer, during its formation, being exposed to oxygen to oxygen gas and ionized nitrogen, and in which the iron nitride-oxide component extends from said upper surface of the magnetic film layer to the non-magnetic substrate.

2. A magnetic recording medium as defined in claim 1 in which said X is larger than said Y.

* * * * *